United States Patent [19]

Whitman et al.

[11] 4,119,474
[45] Oct. 10, 1978

[54] MICROCRYSTALLINE CELLULOSE AS EXTRUSION AID/COMBUSTIBLE FILLER FOR ALUMINA

[75] Inventors: Robert Henry Whitman; William Austin Barber, both of Stamford, Conn.

[73] Assignee: American Cyanamid Company, Stamford, Conn.

[21] Appl. No.: 815,341

[22] Filed: Jul. 13, 1977

[51] Int. Cl.$^2$ ............................................. C04B 35/10
[52] U.S. Cl. .................................... 106/65; 106/73.4; 252/463
[58] Field of Search .......................... 106/41, 65, 73.4; 252/463

[56] References Cited

U.S. PATENT DOCUMENTS 3,856,708   12/1974   Carithers .............................. 252/463

Primary Examiner—James Poer
Attorney, Agent, or Firm—Bruce F. Jacobs; Gordon L. Hart

[57] ABSTRACT

The use of microcrystalline cellulose as an extrusion aid/combustible filler for rehydratable alumina allows the production of low density alumina substrates.

2 Claims, No Drawings

MICROCRYSTALLINE CELLULOSE AS EXTRUSION AID/COMBUSTIBLE FILLER FOR ALUMINA

This invention relates to the production of low density alumina substrates through the use of microcrystalline cellulose as a combination extrusion aid/combustible filler for rehydratable alumina, especially wherein the final calcination treatment thereof occurs at above 1700° F.

The production of low density alumina substrates has become increasingly important in the preparation of auto-exhaust catalysts due to the necessity for increased catalytic activity at the same time as reduced weight for the final product. Generally, it has been found that alumina bodies prepared from a rehydratable form of alumina exhibit superior physical properties to other known aluminas.

The standard procedures for preparing alumina substrates from rehydratable alumina generally include: (1) partially dehydrating alumina trihydrate to make a composition having a substantial portion of rehydratable alumina, often termed rho alumina; (2) grinding the partially dehydrated alumina to a predetermined particle size; (3) mixing the ground particles with water and forming into shaped bodies; (4) rehydrating the shaped bodies at an elevated temperature; and (5) calcining the shaped bodies to activate and harden the alumina.

The present invention is specifically direct to the forming stage of the process. Formed alumina bodies have been produced by conventional shaping methods such as beading, pelletizing or extruding. In conventional extrusion procedures, the alumina powder is blended with water to form a mix of a suitable extrusion consistency, and then extruded by a standard screw type extruder through a die plate having orifices of the desired sizes and shapes. The resultant extrudates may then be cut to the desired lengths and further treated as detailed above.

Rehydratable alumina upon being mixed with water, to then be extruded, will set up in the extruder to form a cementitious mass that binds the extruder screw within its barrel and defies extrusion. Accordingly, there has been considerable interest in "extrusion aids" to facilitate handling of the rehydratable alumina. Correspondingly the desire for a low bulk density alumina having macropores has developed interest in "combustible fillers" which will be destroyed during subsequent calcination of the extrudates.

U.S. Pat. No. 3,856,708 teaches the combined use of a finely divided filler material and a small amount of a suitable lubricant binder in an alumina composition. The filler material is specified as being wood flour and the lubricant binder as Methocel 90 HG 100. The patent then, without exemplification or actual use, indicates the potential use of microcrystalline cellulose, powdered paper pulp and finely divided plastics in place of the wood flour portion of the filler material-lubricant binder mixture.

In contrast, the present invention results in the elimination of the lubricant binder material as was required by U.S. Pat. No. 3,856,708. It has been discovered that when microcrystaline cellulose is used in place of the wood flour there is no necessity for the lubricant binder. As shown by example below when wood flour is used alone in an alumina composition, without a lubricant binder, the mixture sets up in the extruder and is unextrudable. To the contrary, when microcrystalline cellulose is substituted for the wood flour a readily extrudable mixture is prepared without the further incorporation of a lubricant binder.

This invention entails the use of microcrystalline cellulose as a combined extrusion aid and combustible filler for rehydratable alumina in the absence of any lubricant binder. The resultant mixture is readily extrudable.

The microcrystalline cellulose used herein is purified, partially depolymerized cellulose prepared by treating alpha cellulose, obtained as a pulp from fibrous plant material, with mineral acids. It may be prepared as disclosed in U.S. Pat. No. 2,978,446 and is available under the tradename Avicel ® of FMC Corp. Alternatively, depending upon the availability of materials it may be used without the drying operation specified in the patent. It is used in amounts of from 10 to 40% by weight of the dry ingredients, preferably 10 to 30%.

The rehydratable alumina is used to provide 60% to 90%, preferably 65 to 80%, by weight of the dry ingredients. Optionally, up to about 15% by weight of the dry ingredients may be recycled alumina fines ground to 100% less than 325 mesh.

The above ingredients are then combined with water, which has preferably been cooled to between 1°–10° C. to prevent premature rehydration of the alumina. The water is used in amounts to produce extrudable mixtures having in the range of from about 45 to 70 percent solids, preferably 50 to 57 percent.

The mixing of the ingredients with the water may be performed in any manner desired such as through the use of a muller or a continuous mixer such as a 4-inch twin screw Baker-Perkins 100 MPM mixer. When a muller is used residence times of from 5 to 60 minutes are generally sufficient, whereas with a continuous mixer residence times of from 30 seconds to 1 minute suffice.

After the mixing operation has provided a uniform mixture, the material is extruded by means of a standard extruder through dies of the desired size and shape, and the extrudates are cut to the desired length. Preferably, the dimensions of the final calcined substrate particles are in the range of 0.125 inches in diameter and have a length/diameter ratio of about 1.5.

The extrudates are then rehydrated or cured by any of the standard procedures for so doing. Autosteaming may be carried out in covered containers at temperatures of 225°–275° F. for 6 to 20 hours, depending on the required final strength. Direct steaming may be performed by placing the extrudates in trays in an oven preheated to about 225° F. and then injecting steam into the oven for a similar 6 to 20 hours. Alternatively, rehydration or curing may be performed by slowly drying the extrudates in a deep bed under conditions of high relative humidity.

After the rehydration or curing, the extrudates may be washed to remove soda. The washing, if done, is performed by standard techniques with such as acetic acid or ammonium nitrate in either batch or continuous procedures.

The product may then be dried and is then calcined to burn off the microcrystalline cellulose and thereby yield a finished substrate having a low compacted bulk density in the order of 20 to 32, preferably 26–30, lbs./cu. ft. The calcination may be carried out in any suitable manner such as by either direct fired or indirect fired rotary calciners. The calcination temperature which should be in the range of from 1700° to 2000° F., preferably 1750° to 1900° F., serves both to control and effect both the surface area and the pore size distribution of the final product.

Optionally, the rehydrated or cured extrudates may first be calcined and then washed to remove soda. In this case the material would be dried, then calcined, then washed, and then a final drying would be required.

The resultant product has the following basic properties:

| | |
|---|---|
| Pore Volume (water) | 0.9-1.2 cc./g. |
| Crush Strength | >7 lbs. |
| Crush Number | >5 lbs. |
| Bulk Density (compacted) | 20-32 lbs./cu. ft. |
| Surface Area (B.E.T.) | 100-130 m²/g. |
| Shrinkage | <4% |
| Preferably the product has the following properties: | |
| Pore Volume (water) | 0.9-1.1 cc./g. |
| Crush Strength | >10 lbs. |
| Crush Number | >7 lbs. |
| Bulk Density (compacted) | 26-30 lbs./cu. ft. |
| Surface Area (B.E.T.) | 100-130 m²/g. |
| Shrinkage | <4% |

The Crush Strength is determined by compressing a single extrudate pellet between two flat plates and recording the pressure at which the first break of the pellet occurs. The test is conveniently performed on a Chatillon LTCM machine of John Chatillon & Sons, Kew Gardens, New York which has a bottom plate moving up to a top plate at a predetermined speed of from ¼ to 6 inches/minute. Each of the Crush Strengths referred to herein was performed at a rate of about 3.6 inches/minute. The test is then repeated for 99 additional pellets of the same material and the Crush Strength being reported as the average for all 100 samples.

The Crush Number is used to compare the crush strength characteristics of different shaped pellets since the Crush Strength is dependent upon the length of the pellet being tested. It provides a basis for comparison of beads vs. cylinders or polylobal shapes, wherein each of the pellets has the same diameter. In order to equate the strengths of the different shapes, the length of the nonspherical sample must be considered. Thus the Crush Number for cylinders and polylobal shapes is defined as:

$$\text{Crush No.} = \frac{\text{Crush Strength}}{7 \times \text{length of sample}}$$

As stated, the pore size distribution is dependent upon the calcination temperature with a higher calcination temperature yielding a higher pore volume. Representative distributions are as follows:

| Percent Pore Volume in Range, A Diameter | Calcination Temp. | |
|---|---|---|
| | 1800° F. | 1900° F. |
| <100 | 2-9 | 2-3 |
| 100-200 | 12-20 | 16-18 |
| 200-300 | 4-14 | 11-13 |
| >300 | 57-82 | 66-71 |

The following examples are intended to be merely illustrative of the present invention and not in limitation thereof. The surface area and the shrinkage of each of the products of the examples is within the ranges specified above.

EXAMPLE I

Rehydratable alumina was combined with microcrystaline cellulose (Avicel ® of FMC Corporation) in a ratio of 70 parts rehydratable alumina to 30 parts microcrystalline cellulose and then mixed with sufficient water to prepare a mixture containing 52% solids. The mixture was mulled for 30 minutes in a Lancaster muller with a 2½ foot diameter pan, and then extruded using a 2-inch Welding Engineers extruder to form 0.125 inch diameter cylindrical extrudates which were cut during the extrusion to a length/diameter ratio of about 1.5-1.8.

The extrudates obtained were cured by autosteaming in a closed container at 250° F. for 16-18 hours, oven dried at 250° F. for about 2 hours, and then calcined in an American Gas Furnace rotary calciner at 1800° F. for 30 minutes to obtain a low density catalyst substrate. The resultant substrate had the following properties:

| | |
|---|---|
| Pore Volume (water) | 1.1 cc./g. |
| Bulk Density (compacted) | 26 lbs./cu. ft. |
| Crush Strength | 15.0 lbs. |
| Crush Number | 10.9 lbs. |

EXAMPLE II

A sufficient quantity of the formulation as prepared in Example I was mulled in seven consecutive batches. The batches were then consecutively fed to a continuous extruder so that a continuous extrusion run of four hours duration was achieved. The material obtained was cured and calcined as described in Example I. The resultant product had the following properties:

| | |
|---|---|
| Pore Volume (water) | 1.0 cc./g. |
| Bulk Density (compacted) | 28 lbs./cu. ft. |
| Crush Strength | 10.6 lbs. |
| Crush Number | 8.4 lbs. |
| Pore Size | Distribution (%) |
| <100 | 7.6 |
| 100-200 | 12.8 |
| 200-300 | 4.7 |
| >300 | 74.9 |

COMPARISON EXAMPLE

The procedure of Example I was repeated except substituting 30 parts of wood flour for the microcrystalline cellulose. The resultant mixture, having 55% solids, was found to be unextrudable, and, in fact, during the extrusion attempt, the extrusion die was broken.

A second attempt to extrude a 55% solids mixture of 85 parts of rehydratable alumina and 15 parts of wood floor was also unsuccessful.

EXAMPLE III

Rehydratable alumina was combined with microcrystalline cellulose and fines in the proportion of 70 parts rehydratable alumina to 25 parts microcrystalline cellulose to 5 parts fines and then with water which had been previously chilled to 1° C., to prepare a 1000 lb. mixture containing 50% solids. The mixture was mulled for 5 minutes in a production muller, and then extruded using a 4-inch Welding Engineers production extruder to form 0.125 inch cylindrical extrudates. The extrudates were cut during extrusion process to give a length/diameter ratio of 1.5-1.8.

The extrudates obtained were cured by autosteaming in closed containers at about 275° F. for 16 hours, washed to remove soda, and oven dried at about 275° F.

Representative samples of cured and washed extrudates were muffle-calcined at 1800° F. for 45 minutes, while the bulk of the extrudate sample was calcined in a direct fired kiln at 1750° F. for approximately 30 minutes. The resultant properties were:

| Pore Volume (water) | — |
|---|---|
| Bulk Density (compacted) | 27.2 lbs./cu. ft. |
| Crush Strength | 9.1 lbs. |
| Crush Number | 7.6 lbs. |
| Pore Size Distribution | (%) |
| <100 | 8.0 |
| 100–200 | 18.7 |
| 200–300 | 12.3 |
| >300 | 61.0 |

EXAMPLE IV

A combination of 75 parts rehydratable alumina, 20 parts microcrystalline cellulose and 5 parts fines was admixed with water, previously chilled to 1° C., to prepare a mixture containing 52.5% solids. The mixture was mulled 15 minutes, then extruded, washed and calcined according to the procedure described in Example III. The product had the following properties:

| Bulk Density (compacted) | 28.8 lbs./cu. ft. |
|---|---|
| Crush Strength | 13.6 lbs. |
| Crush Number | 8.9 lbs. |

EXAMPLE V

Rehydratable alumina was combined with microcrystalline cellulose and fines in the proportion of 65 parts rehydratable alumina to 30 parts of microcrystalline cellulose to 5 parts fines and then admixed with water, previously chilled to 8° C., to prepare a mixture containing 52% solids. The mixture was mulled for 10 minutes, then extruded as in Example III. Representative samples of the fresh extrudates were autosteamed for 16 hours at 250°–275° F., oven dried at 250° F., then muffle-calcined at 1800° F. for 45 minutes. A sample of this material had the following properties:

| Bulk Density (compacted) | 25.3 lb./cu. ft. |
|---|---|
| Crush Strength | 8.2 lbs. |
| Crush Number | 6.3 lbs. |

EXAMPLE VI

Rehydratable alumina was combined with microcrystaline cellulose in a ratio of 70 parts rehydratable alumina to 30 parts microcrystalline cellulose and then admixed with water, previously chilled to 1° C., to prepare a mixture containing 50% solids. The mixture was mulled and extruded as described in Example III. Representative samples of the fresh extrudates were autosteamed at 250°–275° F. for 12–20 hours, oven dried at 250° F., then muffle-calcined at 1800° F. for 45 minutes. The product had the following properties:

| Bulk Density (compacted) | 25.1 lbs./cu. ft. |
|---|---|
| Crush Strength | 9.7 lbs. |
| Crush Number | 7.3 lbs. |
| Pore Size Distribution | (%) |
| <100 | 2.9 |
| 100–200 | 16.6 |
| 200–300 | 10.4 |
| >300 | 70.1 |

EXAMPLE VII

A mixture of 75 parts rehydratable alumina, 15 parts microcrystalline cellulose, and 10 parts fines was blended for 15 minutes in a ribbon blender. Batch size was 440 lbs. of combined powders. The blended powder mixture and water sufficient to make a 53% solids mixture were then separately metered to a 4-inch, twin screw continuous mixer (Baker-Perkins 100 MPM) fitted with a 0.125 inch diameter steel die. Continuous mixing and direct extrusion were then carried out during a 90 minute run. Representative samples samples of the fresh extrudates, which were cut during extrusion to a length/diameter ratio of about 2.0, were combined and then autosteamed at 250° F. for 18 hours, oven dried at 250° F. and muffle-calcined at 1800° F. for 30 minutes. The resultant product had the following properties:

| Bulk Density (compacted) | 26.0 lbs./cu. ft. |
|---|---|
| Crush Strength | 7.6 lbs. |
| Crush Number | 5.0 lbs. |

EXAMPLE VIII

A mixture of 75 parts rehydratable alumina, 10 parts microcrystalline cellulose and 15 parts fines were blended for 15 minutes in a ribbon blender.

The blended powder formulation and water were then continuously mixed and directly extruded as described in Example VII during a 2.5 hour run. Representative samples of the fresh extrudates were combined and then treated according to the procedure outlined in Example VII. The product had the following properties:

| Bulk Density (compacted) | 27.0 lbs./cu. ft. |
|---|---|
| Crush Strength | 8.6 lbs. |
| Crush Number | 5.7 lbs. |

EXAMPLE IX

A continuous mixing and direct extrusion run lasting 4 hours was carried out as described in Example VII by independently metering 70 parts rehydratable alumina, 25 parts microcrystalline cellulose, 5 parts fines and water to the continuous mixer extruder. No cooling water was required during this procedure. Representative samples were gathered at regular intervals, cured by autosteaming at 250° F. for 18 hours and oven dried at 250° F. The cured, oven dried samples were then combined and calcined in a rotary calciner at 1800° F. for 30 minutes. The resultant product had a compacted bulk density of 22.5 lbs./cu. ft.

What is claimed is:

1. An alumina substrate consisting essentially of extrudates made from rehydratable alumina wherein the extrudates have the following properties:

| Pore Volume (water) | 0.9–1.2 cc./g. |
|---|---|
| Crush Strength | >7 lbs. |
| Crush Number | >5 lbs. |

| | |
|---|---|
| Bulk Density (compacted) | 20–32 lbs./cu. ft. |
| Surface Area (B.E.T.) | 100–130 m²/g. |
| Shrinkage | <4% |

2. The alumina substrate of claim 1 wherein the extrudates have the following properties:

| | |
|---|---|
| Pore Volume (water) | 0.9–1.1 cc./g. |
| Bulk Density (compacted) | 26–30 lbs./cu. ft. |
| Crush Strength | >10 lbs. |
| Crush Number | >7 lbs. |
| Surface Area (B.E.T.) | 100–130 m²/g. |
| Shrinkage | <4% |

* * * * *